United States Patent
Taniguchi

(10) Patent No.: US 6,455,946 B2
(45) Date of Patent: Sep. 24, 2002

(54) ALTERNATING-CURRENT GENERATING APPARATUS FOR AN AUTOMOTIVE VEHICLE

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 09/808,364

(22) Filed: Mar. 15, 2001

(30) Foreign Application Priority Data

Mar. 15, 2000 (JP) .......................................... 2000/72914
Oct. 17, 2000 (JP) ........................................ 2000/316461

(51) Int. Cl.⁷ ............................................. H02K 23/52
(52) U.S. Cl. ........................................ 290/32; 192/41 R
(58) Field of Search ................................ 290/32, 31, 7; 192/41 R

(56) References Cited

U.S. PATENT DOCUMENTS

| | | | |
|---|---|---|---|
| 4,725,259 A | | 2/1988 | Miyata ......................... 474/70 |
| 5,402,007 A | * | 3/1995 | Center et al. ................ 123/367 |
| 5,575,366 A | | 11/1996 | Zenmei et al. ................. 192/45 |
| 5,818,115 A | * | 10/1998 | Nagao ........................ 180/65.1 |
| 6,083,130 A | * | 7/2000 | Mevissen et al. ......... 192/107 T |
| 6,095,301 A | * | 8/2000 | Fujiwara et al. ......... 192/110 B |
| 6,116,393 A | * | 9/2000 | Ooitsu et al. ........... 192/110 B |
| 6,237,736 B1 | * | 5/2001 | Ouchi ....................... 192/41 R |

FOREIGN PATENT DOCUMENTS

| | | |
|---|---|---|
| JP | 7-72585 | 8/1995 |
| JP | 8-140308 | 5/1996 |
| JP | 9-140196 | 5/1997 |
| JP | 200114135 A * | 5/2001 |

* cited by examiner

Primary Examiner—Joseph Waks
(74) Attorney, Agent, or Firm—Oliff & Berridge, PLC

(57) ABSTRACT

An automotive alternator is driven by an internal combustion engine via a one-way clutch. When the internal combustion engine is in an idling condition, the power generation amount of the automotive alternator is increased during the engaged state of the one-way clutch and is reduced during the disengaged state of the one-way clutch, thereby adequately suppressing the fluctuation of engine speed without increasing the size and weight of the one-way clutch equipped automotive alternator installed on the internal combustion engine.

4 Claims, 9 Drawing Sheets

ALTERNATING-CURRENT GENERATING APPARATUS FOR AN AUTOMOTIVE VEHICLE

BACKGROUND OF THE INVENTION

The present invention relates to an alternating-current generating apparatus for an automotive vehicle comprising an alternator which is driven by an internal combustion engine via a one-way clutch.

Conventionally, from the view point of global environmental protection, reduction of emission gas and reduction of fuel consumption are essential targets to be attained. When driving, automotive vehicles are often in idling conditions where the engine does not contribute to drive. In view of the above, there is a tendency that the engine rotational speed in this idling condition (hereinafter referred to as idling speed) is set to a relatively low value. However, reducing the idling speed will encounter with the difficulty in stabilizing the engine rotation due to increase of friction. This problem is remarkable in the diesel engines. Furthermore, long-term cyclic fluctuation of the engine rotation will appear due to delay caused in the control system of the internal combustion engine.

The low idling speed condition causing undesirable fluctuation in the engine rotation may be referred to as an idle hunting state. FIG. 4 shows the behavior of the automotive alternator in such a low idling speed condition.

It is now assumed that, in the idle hunting state, the engine rotational speed is decreasing. In this case, the rotational speed of the automotive alternator reduces correspondingly with reducing engine speed. However, under a condition that the automotive alternator is working for a constant electric load, a required driving torque of the automotive alternator increases with reducing engine speed. As a result, the increased driving torque of the automotive alternator will undesirably promote the reduction of the engine speed. On the contrary, when the engine speed is increasing, the required driving torque of the automotive alternator decreases with increasing engine speed. As a result, the decreased driving torque of the automotive alternator will undesirably promote the increase of the engine speed.

To solve the above-described troublesome hunting promotion appearing in the engine rotational speed of this kind of automotive alternator, the published Japanese patent No. 7-72585 discloses a one-way clutch disposed in a driving pulley of the alternator. The one-way clutch equipped pulley operates in the following manner.

When the rotational speed of the internal combustion engine is decreasing (i.e., in a deceleration condition), large-small relationship between an inertia torque of the alternator and an output torque generated from the engine torque is inversed momentarily. In this case, the one-way clutch is brought into a disengaged state so that the degree of engine speed reduction can be suppressed. The undesirable fluctuation of engine rotation can be suppressed correspondingly.

However, the research and tests conducted by the inventor of this application have revealed that the above-described one-way clutch equipped pulley does not bring satisfactory effects in the suppression of engine rotational fluctuation appearing in the automotive alternator.

Hereinafter, the problem of the one-way clutch equipped automotive alternator will be explained in more detail with reference to FIG. 7.

An external wheel 33 of a one-way clutch is entrained by a crank pulley (not shown) via a belt. A clutch portion, comprising sprag and roller members and a spring member (which are not shown), selectively engages or disengages an internal wheel 31 and the external wheel 33.

A driving torque $\tau 1$ of the internal combustion engine acts on the external wheel 33. A driving torque $\tau 2$ of the automotive alternator, which is referred to as power generation torque, acts on the internal wheel 31 in a direction opposed to the engine driving torque $\tau 1$. Furthermore, inertial of an alternator rotor causes an inertial torque $\tau 3$ which also acts on the internal wheel 31. The inertial torque $\tau 3$ changes its direction in accordance with change of rotation of the internal wheel 31. The direction of the inertial torque $\tau 3$ is identical with that of the alternator driving torque $\tau 2$ when the rotational speed of the internal wheel 31 is increasing and is opposed when decreasing. Engagement and disengagement of the one-way clutch is designed so as to be determined according to the large and small relationship among these three torques.

The directions of torques $\tau 1$, $\tau 2$, and $\tau 3$ shown in FIG. 7 are now assumed to be positive, while $\omega 1$ represents the rotational speed of the internal wheel 31 and $\omega 2$ represents the rotational speed of the external wheel 33. The one-way clutch is engaged when $\tau 1 \geq \tau 3 - \tau 2$ (where $\omega 1 = \omega 2$) and is disengaged when $\tau 1 < \tau 3 - \tau 2$.

At a moment the engine speed starts decreasing from accelerating or constant speed rotation, the torque $\tau 1$ decreases correspondingly. In this case, the inertial torque $\tau 3$ of the automotive alternator will exceed the engine driving torques $\tau 1$ which acts in the same direction as that of the inertial torque $\tau 3$. The above condition $\tau 1 < \tau 3 - \tau 2$ is established. Thus, the one-way clutch is disengaged.

Subsequently, the rotational speed of the automotive alternator decreases due to power generation torque $\tau 2$ as well as friction loss at the bearing portion and wind loss at the cooling fan.

When the rotational speed of the automotive alternator starts decreasing, the above-described power generation torque $\tau 2$ increases correspondingly. This will forcibly and promptly decrease the rotational speed of the alternator. The composite torque acting on the internal wheel 31 will soon be equalized with the torque acting on the external wheel 33. Thus, the one-way clutch is engaged shortly.

According to recent compact high power automotive alternators, the power generation torque $\tau 2$ is larger than the inertia torque $\tau 3$ during the disengaged state of the one-way clutch. Therefore, the rotational speed of the alternator rotor decreases quickly and the one-way clutch is again engaged within a short period of time after the one-way clutch is once disengaged, even when the engine speed is decreasing or in the very beginning of acceleration from its lowest rotational speed (where the increasing rate of the rotational speed is small).

As a result, the above-described conventional automotive alternator cannot bring satisfactory effect, although the one-way clutch is intentionally provided to release the internal combustion engine from the load torque of the automotive alternator when the internal combustion engine is decreasing.

Increasing the inertia mass of the automotive alternator is effective to solve the above-described problem since the rotational speed of the automotive alternator will not decrease so quickly. However, increased size and weight of the automotive alternator will induce another problem to be solved.

SUMMARY OF THE INVENTION

In view of the foregoing problems of the prior art, the present invention has an object to provide an alternating-current generating apparatus for an automotive vehicle which is capable of adequately suppressing the fluctuation of engine speed without increasing the size and weight of a one-way clutch equipped automotive alternator installed on an internal combustion engine.

To accomplish the above and other related objects, the present invention provides an alternating-current generating apparatus for an automotive vehicle comprising a one-way clutch, an automotive alternator driven by an internal combustion engine via the one-way clutch, and control means for controlling a power generation amount of the automotive alternator. A detecting means is provided for detecting a rotational speed of either the internal combustion engine or the automotive alternator as well as an electric amount relating to a on-off state of the one-way clutch. The control means performs at least one of two power controls when the internal combustion engine is in a low-rotational operating condition. One of the two power controls is to increase the power generation amount during an engaged state of the one-way clutch, and the other of the two power controls is to decrease the power generation amount during a disengaged state of the one-way clutch.

According to this arrangement, without increasing the size and weight of the automotive alternator, it becomes possible to prevent the rotational speed of the automotive alternator from rapidly decreasing during a disengaged state of the one-way clutch. Thus, it becomes possible to adequately suppress the fluctuation of engine rotation when the one-way clutch equipped automotive alternator is installed on an internal combustion engine.

In other words, the present invention solves the following problems.

Namely, during the disengaged state of the one-way clutch, the rotational speed of the automotive alternator, i.e., the rotational speed of the internal wheel of the clutch, decreases due to the power generation torque. As a result, even when the internal combustion engine is decelerating or in the very beginning of acceleration, the one-way clutch is re-engaged so as to increase the load torque of the internal combustion engine. This will induce undesirable reduction of rotational speed during the deceleration period of the internal combustion engine and will obstruct the buildup of acceleration in the very beginning of the acceleration period or in a situation where the acceleration rate is small. Hence, the internal combustion engine suffers from large fluctuation appearing in the rotational speed. Such undesirable fluctuation of engine speed gives adverse influence to the engine control.

However, according to the present invention, the field of the alternator can be controlled in accordance with the engaged/disengaged state of the clutch so that the engine can be maintained in adequate conditions for the control.

According to the alternating-current generating apparatus for an automotive vehicle of the present invention, it is preferable that the one-way clutch comprises a power input section for receiving a driving power from the internal combustion engine and a power output section mechanically connected to a rotor of the automotive alternator which has a plurality of filed poles. The detecting means detects a rotational speed of the power output section based on a frequency component of an output voltage of a multiphase armature winding of the automotive alternator. And, the control means compares the rotational speed of the power output section with a rotational speed of the power input section and judges that the one-way clutch is in the engaged state when the rotational speed of the power output section is equal to the rotational speed of the power input section and judges that the one-way clutch is in the disengaged state when the rotational speed of the power output section is not equal to the rotational speed of the power input section.

This arrangement makes it possible to discriminate the engaged state and the disengaged state of the clutch by using a simple comparing circuit and well-known F–V convertors.

According to the alternating-current generating apparatus for an automotive vehicle of the present invention, it is preferable that the one-way clutch comprises an external wheel portion constituting the power input section, an internal wheel portion disposed coaxially with the external wheel portion and constituting the power output section, and a clutch portion selectively engaging or disengaging the external wheel portion and the internal wheel portion.

This arrangement makes it possible to easily receive the driving power of the internal combustion engine by forming a pulley or gear portion on an outer periphery of the external wheel portion, thereby realizing an extremely compact clutch device for the automotive alternator.

According to the alternating-current generating apparatus for an automotive vehicle of the present invention, it is preferable that the automotive alternator has a field winding, and the control means is associated with switching means connected in series with the field winding for on-off controlling power current supply to the field winding. The control means closes the switching means when the one-way clutch is in the engaged state and opens the switching means when the one-way clutch is in the disengaged state.

This arrangement makes it possible to surely realize desired operations. More specifically, when the one-way clutch is in the engaged condition, the exciting current of the filed winding is increased so as to increase the electric power generation torque, thereby suppressing the rotational speed of the internal combustion from rapidly increasing. When the one-way clutch is in the disengaged condition, the exciting current of the filed winding is decreased so as to decrease the electric power generation torque, thereby suppressing the rotational speed of the internal combustion from rapidly decreasing.

It is preferable that an electric signal discriminating the engaged state and the disengaged state of the one-way clutch serves as an on/off signal of the switching means which controls the supply of the exciting current. This makes it possible to surely synchronize the engagement/disengagement of the one-way clutch with the on/off operation of the switching means. Thus, it becomes possible to instantly suppress the fluctuation of engine speed having an extremely high frequency responsive to the torque variation caused in each stroke of the internal combustion engine, thereby facilitating the engine control and suppressing the vibration.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF PREFERRED EMBODIMENTS

Hereinafter, details of the alternating-current generating apparatus for an automotive vehicle will be explained in accordance with preferred embodiments of the present invention.

First Embodiment

Figure 2:
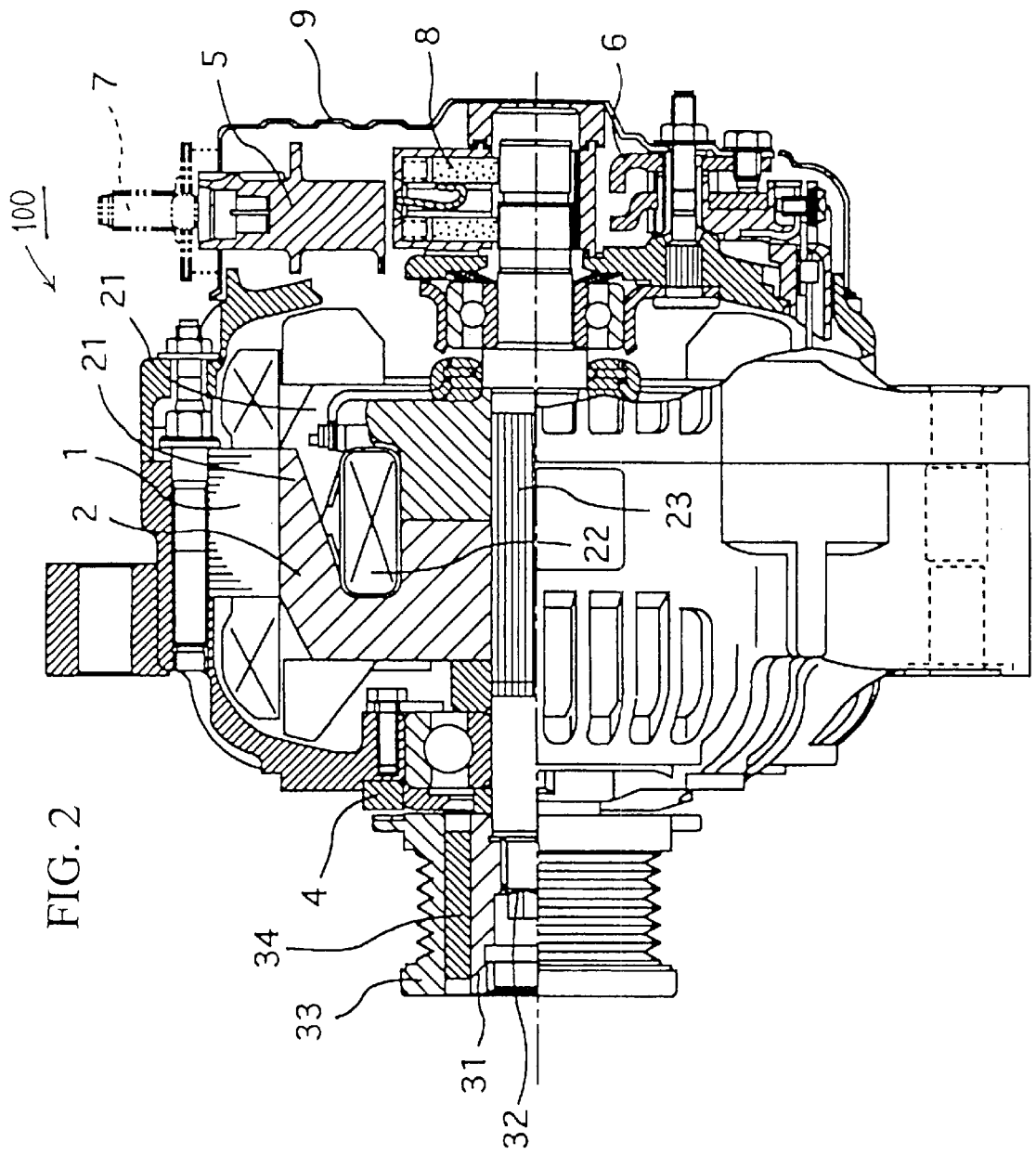
FIG. 2 is a partly cross-sectional view showing an automotive alternator in accordance with the first embodiment of the present invention, taken along an axis of this automotive alternator.

FIG. 2 is a partly cross-sectional view showing an automotive alternator 100 in accordance with the first embodiment of the present invention, taken along an axis of this automotive alternator 100.

The automotive alternator 100 has an armature 1 accommodating a rotor 2 coaxially disposed therein. The rotor 2 has field poles 21. A field winding 22 is wound around the field poles 21 which are coupled and securely fixed to a rotational shaft 23. A one-way clutch has an internal wheel 31 which is fixed to the rotational shaft 23 by means of a nut 32. An external wheel 33 of the one-way clutch is entrained by a crank pulley (not shown) via a belt so as to be driven by an engine (not shown). The outer peripheral portion of the external wheel 33 serves as a pulley. A clutch portion 34, configured into a cylindrical shape, performs torque transmission in only one way from the external wheel 33 to the internal wheel 31. In other words, no torque is transmitted via the clutch portion 34 in the opposite direction from the internal wheel 31 to the external wheel 33.

Regarding the practical arrangement for each of the internal wheel 31, the external wheel 33, and the clutch portion 34, there are various types of conventionally well known components or parts such as the ones incorporated in an engine starter.

A position detector 4 detects a rotational position of the external wheel 33. To adjust an output voltage of the alternator, the field current flowing across the field winding 22 is on-off controlled by a regulator 5. A rectifier 6 converts AC power generated by the armature 1 into DC power. An output terminal 7 is connected to a positive pole fin of the rectifier 6. A brush 8, interposed between the field winding 22 and the regulator 5, supplies exciting current to the field winding 22. A rear cover 9 protects these electric components from the surrounding environment.

Next, operation of the present invention will be explained with reference to a block diagram shown in FIG. 1.

The regulator 5 detects an instantaneous value (analog value) of a mono-phasic voltage 11 of the armature winding 1. The armature winding 1 induces an AC voltage in response to rotation of the field poles 21. When 2p represents the total number of the field poles 21 and Nalt(rpm) represents a mechanical rotational speed of the rotor, the frequency of the induced AC voltage is expressed by $$f = p \cdot Nalt/60 \ (Hz)$$

A comparator 51 compares the mono-phasic voltage 11 of the armature winding 1 with an appropriate threshold for binarization and produces a rectangular wave pulse signal having the above-described frequency. A first F–V converter 52 receives the rectangular wave pulse signal produced from the comparator 51 and produces a DC voltage whose magnitude is proportional to the rotational speed of the rotor 2. The magnitude of this DC voltage represents a rotational speed $\omega 1$ of the internal wheel 31 (i.e., the rotor 2).

A position detector 4, provided in the vicinity of the external wheel 33, generates a rectangular wave pulse signal whose frequency is proportional to the rotational speed of the external wheel 33. A second F–V converter 53 receives the rectangular wave pulse signal produced from the position detector 4 and produces a DC voltage whose magnitude is proportional to the rotational speed of the external wheel 33. The magnitude of this DC voltage represents a rotational speed $\omega 2$ of the external wheel 33. The position detector 4 of this embodiment is, for example, a conventional rotation speed detector, such as a photoelectric sensor or a semiconductor sensor. Alternatively, the position detector 4 can be omitted when the rotational speed $\omega 2$ of the external wheel 33 is calculated based on the engine speed and a pulley ratio between the crank pulley and the external wheel 33. A comparator 54 of the regulator 5 compares two DC voltages representing the rotational speeds $\omega 1$ and $\omega 2$, respectively.

A voltage setter 55 is provided to set a regulated voltage Vreg for the idling condition where the rotational speeds $\omega 2$ of the external wheel 33 is not larger than a predetermined value. The voltage setter 55 adjusts the regulated voltage Vreg to a first set value, e.g., 14.5 V, when the one-way clutch is engaged (i.e., $\omega 1 = \omega 2$).

Furthermore, the voltage setter 55 adjusts the regulated voltage Vreg to a second set value, e.g., 12.5 V, which is lower than the first set value when the one-way clutch is disengaged (i.e., $\omega 1 > \omega 2$).

A battery voltage Vbatt is entered via a low-pass filter 56 into a negative input terminal of a comparator 57. A positive input terminal of the comparator 57 receives the regulated voltage Vreg generated from the voltage setter 55. The comparator 57 generates an off signal for a transistor 58 when the battery voltage Vbatt is larger than the regulated voltage (i.e., Vbatt>Vreg) and generates an on signal for the transistor 58 when the battery voltage Vbatt is smaller than the regulated voltage (i.e., Vbatt<Vreg). The transistor 58 receives power voltage through a B terminal and controls the field current via an F terminal 60 of the regulator 5. A flywheel diode 59, connected to the earth through an E terminal, circulates the field current during the off state of the transistor 58. The F terminal 60 is connected to the field winding 22 via the brush 8.

According to an automotive alternator having a rated voltage of 12V, the battery voltage Vbatt is usually adjustable within a range of 12V to 14V. For example, in the case of setting the regulated voltage Vreg to 14.5V, the charging operation continues until the battery voltage Vbatt reaches 14.5V. In the case of setting the regulated voltage Vreg to 12.5V, the power generation is suppressed once the battery voltage Vbatt has reached 12.5V. As the open terminal voltage of the battery is usually in a range of 12V to 12.5V, the terminal voltage immediately reaches 12.5V. Thus, the power generation is stopped within a short period of time. When the automotive alternator 100 generates electric power, a driving torque (i.e., power generation torque) proportional to the current flowing across the armature winding acts on the internal wheel 31.

Figure 4:
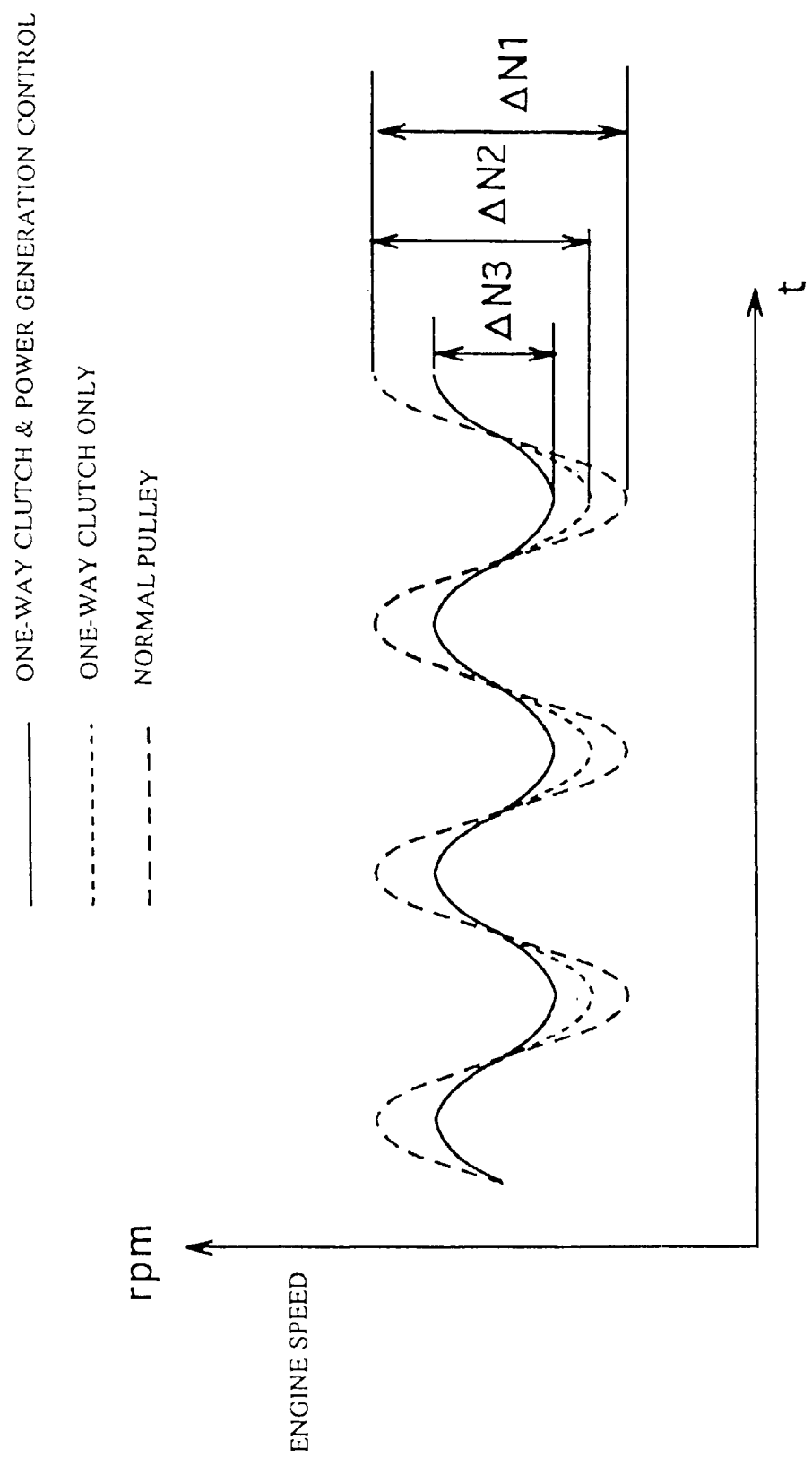
FIG. 4 is a timing chart showing cyclic fluctuation appearing in the engine speed.

As described above, according to the first embodiment, the power generation amount during the disengaged state of the one-way clutch is reduced compared with the power generation amount during the engaged state. Thus, the power generation torque τ2 acting on the internal wheel 31 (which controls the rotation of the alternator) during the disengaged state of the one-way clutch becomes small. The reduction of rotational speed of the internal wheel 31 is adequately suppressed. As a result, it becomes possible to delay the engaging timing of the one-way clutch until the rotational speed of the internal combustion engine increases sufficiently (i.e., until the internal combustion torque ω1 increases sufficiently). Hence, it becomes possible to adequately suppress the fluctuation ΔN3 appearing in the engine speed compared with the conventional fluctuation ΔN1 or ΔN2 as shown in FIG. 4.

Furthermore, when the one-way clutch is engaged in the beginning of an increasing state of the engine rotational speed, the engine load increases suddenly. This forces the conventional engine to consume a great amount of fuel to return the engine speed to a target value. However, according to the first embodiment, the engagement of the one-way clutch is delayed until the engine speed is almost restored to the target value. Therefore, the first embodiment does not require the engine to consume excessive fuel to quickly return the target speed.

The internal combustion engine of the present invention is not limited to diesel engines. Therefore, the present invention can be applied to gasoline engines too.

Furthermore, instead of using the above-described switching of the setting value for the regulated voltage Vreg, the power generation control can be performed by linearly changing the setting value for the regulated voltage Vreg or based on the duty ratio control of the field current control transistor 58.

Figure 3:
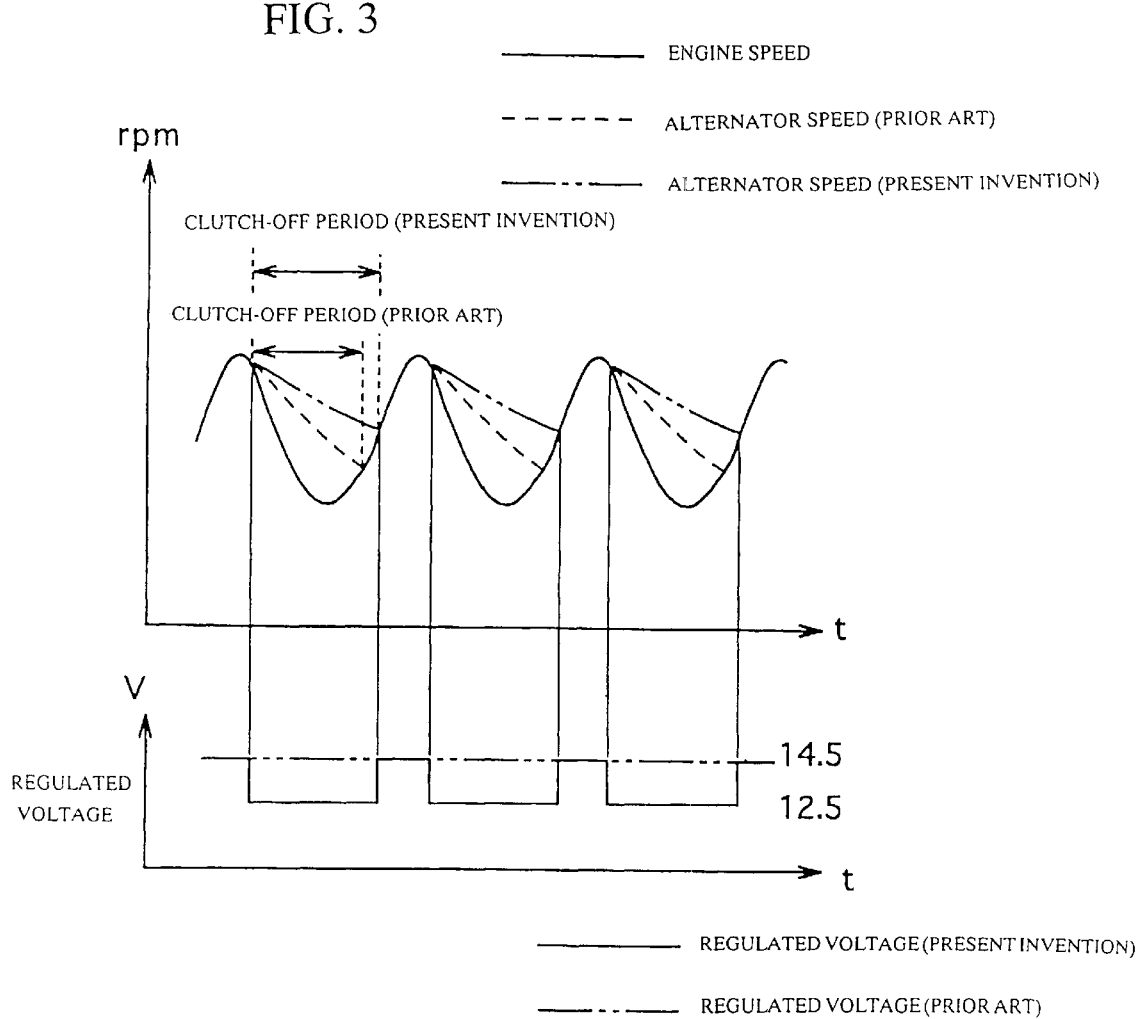
FIG. 3 is a timing chart showing power generation control of the automotive alternator in accordance with the first embodiment of the present invention.

FIG. 3 shows the difference of operation between the automotive generator in accordance with the first embodiment and a conventional alternator having no one-way clutch. According to the first embodiment, the above-described power generation control is performed in synchronism with the one-way clutch operation. Therefore, as shown in FIG. 3, the clutch-off period can be extended. The free term during which the engine is released from the load of the alternator can be extended. When the increase of engine speed is suppressed in this free term, the first embodiment promptly responds to such suppression. Furthermore, the first embodiment concentrates the clutch-on period so as to agree with the peak period of the engine torque. This is effective to reduce the fluctuation of engine torque.

Second Embodiment

Figure 5:
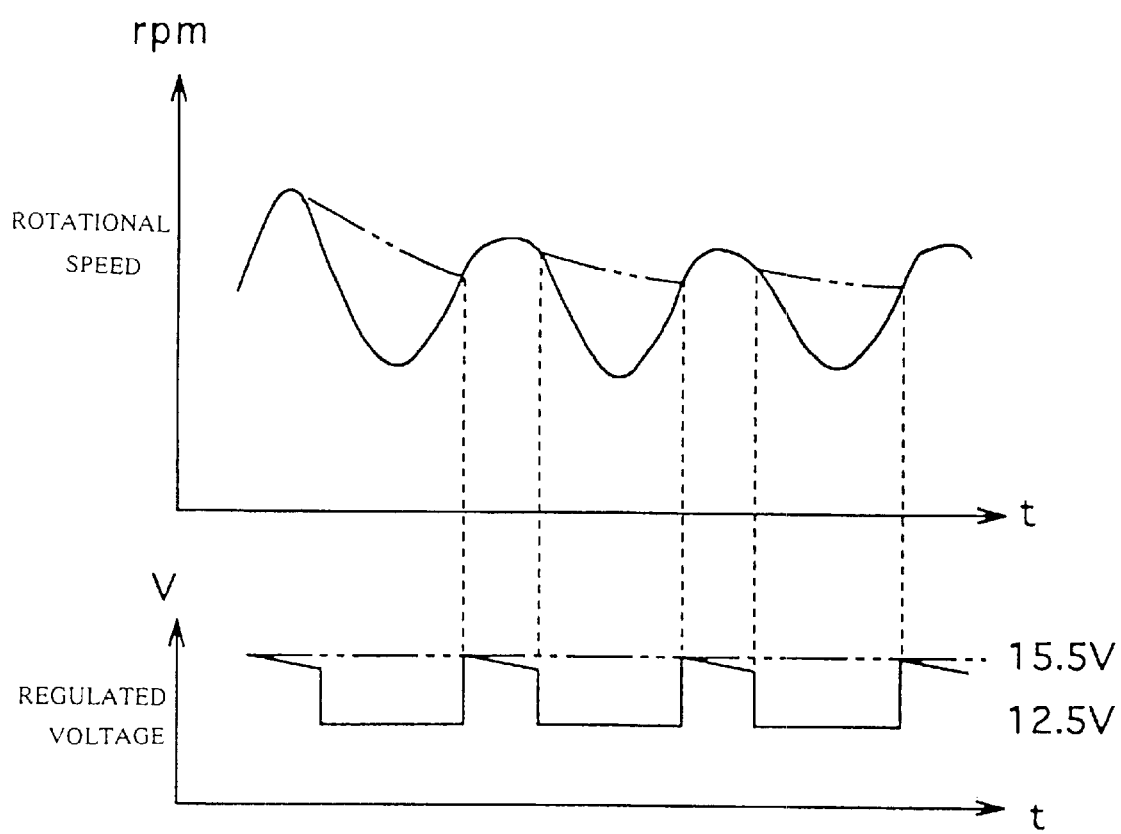
FIG. 5 is a timing chart showing power generation control of an automotive alternator in accordance with a second embodiment of the present invention.

A second embodiment of the present invention will be explained with reference to FIG. 5.

The second embodiment is similar to the above-described first embodiment in that the regulated voltage Vreg is set to a higher value, e.g., 15.5V, at the moment the one-way clutch is engaged or immediately after that. But the second embodiment is characterized in that the set value for the regulated voltage Vreg is gradually reduced with elapsed time.

According to the second embodiment, the automotive alternator 100 performs full generation of electric power at the moment the one-way clutch is engaged or immediately after that. In this condition, a maximized braking torque acts on the engine so as to adequately suppress the increase of engine speed.

Next, instead of maintaining the regulated voltage Vreg at the same value (15.5V), the second embodiment gradually reduces the set value of the regulated voltage Vreg during the engaged state of the one-way clutch. This is effective to prevent the battery from being excessively charged. Accordingly, the life of battery can be extended.

The second embodiment suppresses the power generation during the clutch-off period. The engine control apparatus can promptly return the engine speed to a target value. More specifically, the engine has a large inertia and tends to cause an overshoot after reaching a target speed when it is accelerated sufficiently.

Hence, the second embodiment immediately increases the power generation amount of the alternator at the moment the one-way clutch is engaged (i.e., at the moment the engine speed is almost restored the target speed) so as to enhance the engine braking torque. Thus, it becomes possible to effectively suppress the above-described overshoot of the engine speed, thereby stabilizing the engine speed.

Figure 8:
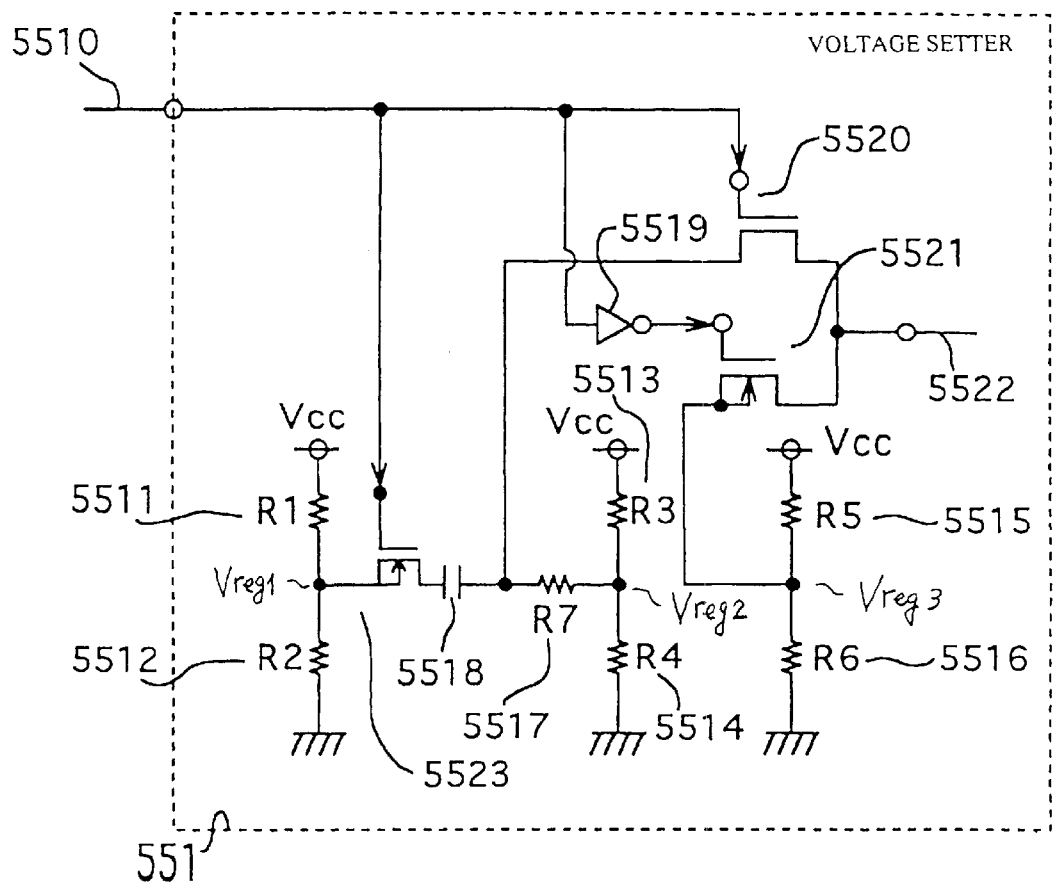
FIG. 8 is a circuit diagram showing a voltage setter in accordance with the second embodiment of the present invention.
Figure 9:
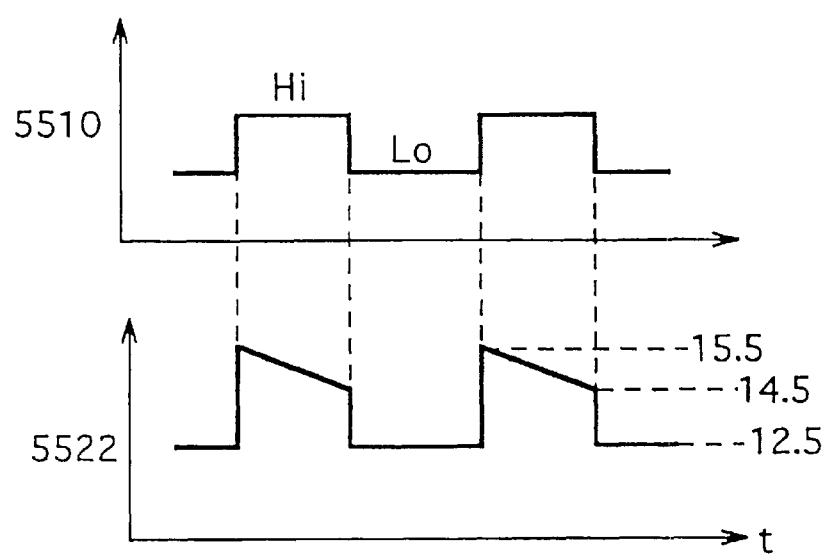
FIG. 9 is a timing chart showing the operation of the voltage setter shown in FIG. 8.

FIG. 8 shows a circuit arrangement of a voltage setter in accordance with the second embodiment. FIG. 9 is a timing chart showing signal changes in the voltage setter shown in FIG. 8.

Figure 1:
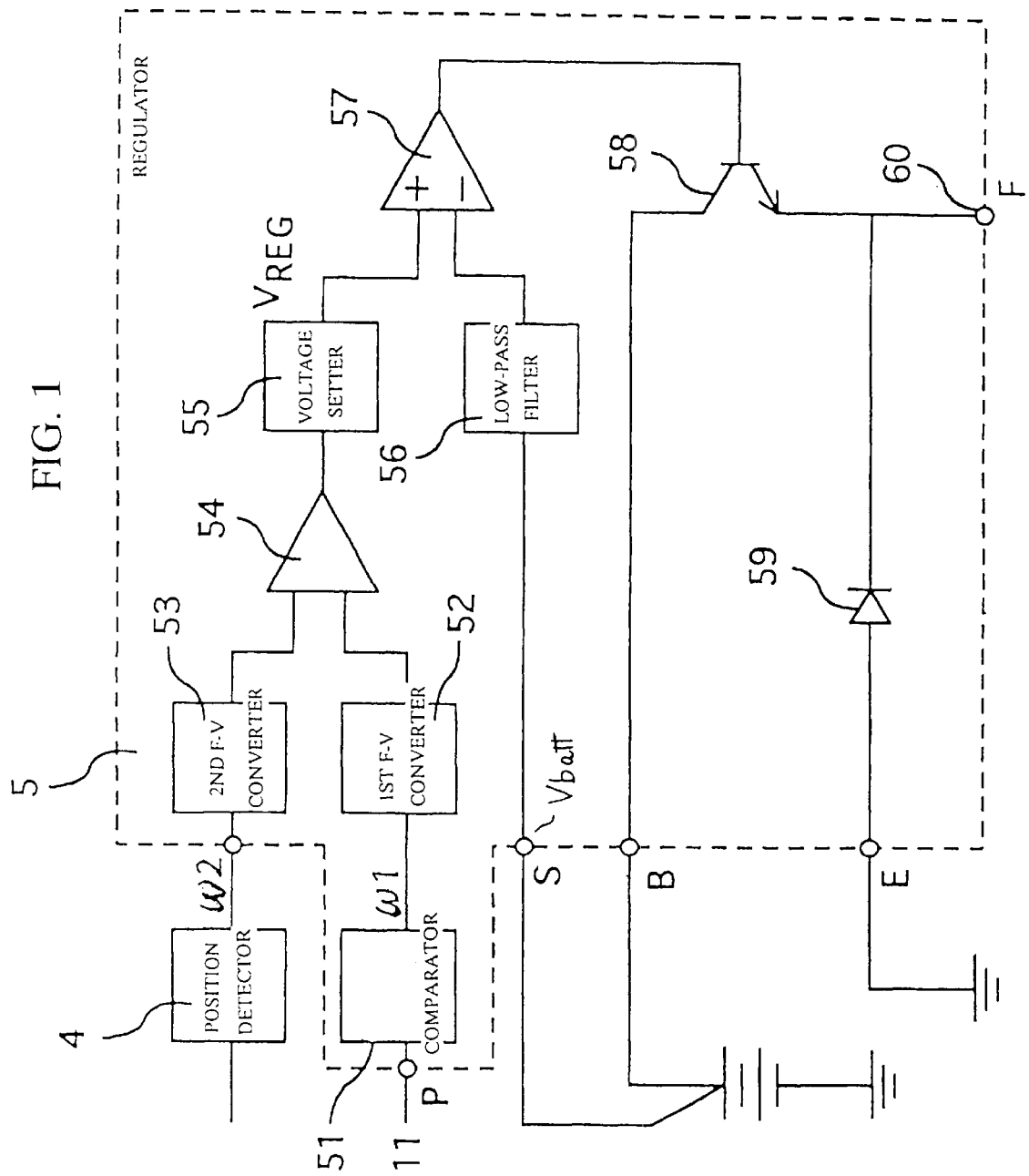
FIG. 1 is a block diagram showing the circuit arrangement for the power generation control of an automotive alternator in accordance with a first embodiment of the present invention.

A voltage setter 551 corresponds to the voltage setter 55 shown in FIG. 1 and therefore has the same input/output relationship as that shown in FIG. 1. An input terminal 5510 receives a comparison result between the rotational speed ω1 of the internal wheel 31 and the rotational speeds ω2 of the external wheel 33 generated from the comparator 54. It is now assumed that the comparator 54 produces a Hi-level output signal when ω1=ω2 and a Lo-level output signal when ω1<ω2. Two serially connected resistors 5511 (=R1) and 5512 (=R2) cooperatively divide the power voltage into a first reference value Vreg1 of approximately 15.5V. Two serially connected resistors 5513 (=R3) and 5514 (=R4) cooperatively divide the power voltage into a second reference value Vreg2 of approximately 14.5V. Two serially connected resistors 5515 (=R5) and 5516 (=R6) cooperatively divide the power voltage into a third reference value Vreg3 of approximately 12.5V.

A resistor 5517 and a capacitor 5518 cooperatively constitute a filter for gradually changing the regulated voltage Vreg from the first reference value Vreg1 (≈15.5V) to the second reference value Vreg2 (≈14.5V). When R7 represents the resistance value of resistor 5517 and C1 represents the capacitance value of capacitor 5518, the regulated voltage Vreg changes with a time constant C1·R7.

An inverter 5519 generates an inversed output of the comparator 54 which serves as a gate drive signal for a switch 5521. A switch 5520 generates the regulated voltage Vreg which gradually reduces from the first reference value Vreg1 (≈15.5V) to the second reference value Vreg2 (≈14.5V). A switch 5521, whose operation is in exclusive relationship with that of the switch 5520, generates the regulated voltage Vreg which is equal to the third reference value Vreg3 (≈12.5V). An output line 5522 generates an output signal of the voltage setter 551. This output signal is supplied to the comparator 57.

When the one-way clutch is engaged (i.e., $\omega1=\omega2$), the input terminal 5510 receives a Hi-level signal. The switches 5520 and 5523 turn on, while the switch 5521 turns off. The regulated voltage Vreg is once set to the higher voltage Vreg1 (≈15.5V). After that, due to function of the filter, the regulated voltage Vreg1 gradually decreases to the level of the second reference value Vreg2 (≈14.5V) with elapsed time.

On the other hand, when the one-way clutch is disengaged (i.e., $\omega1<\omega2$), the regulated voltage Vreg is set to the constant level of the third reference value Vreg3 (≈12.5V) so as to suppress the power generation.

Third Embodiment

Figure 6:
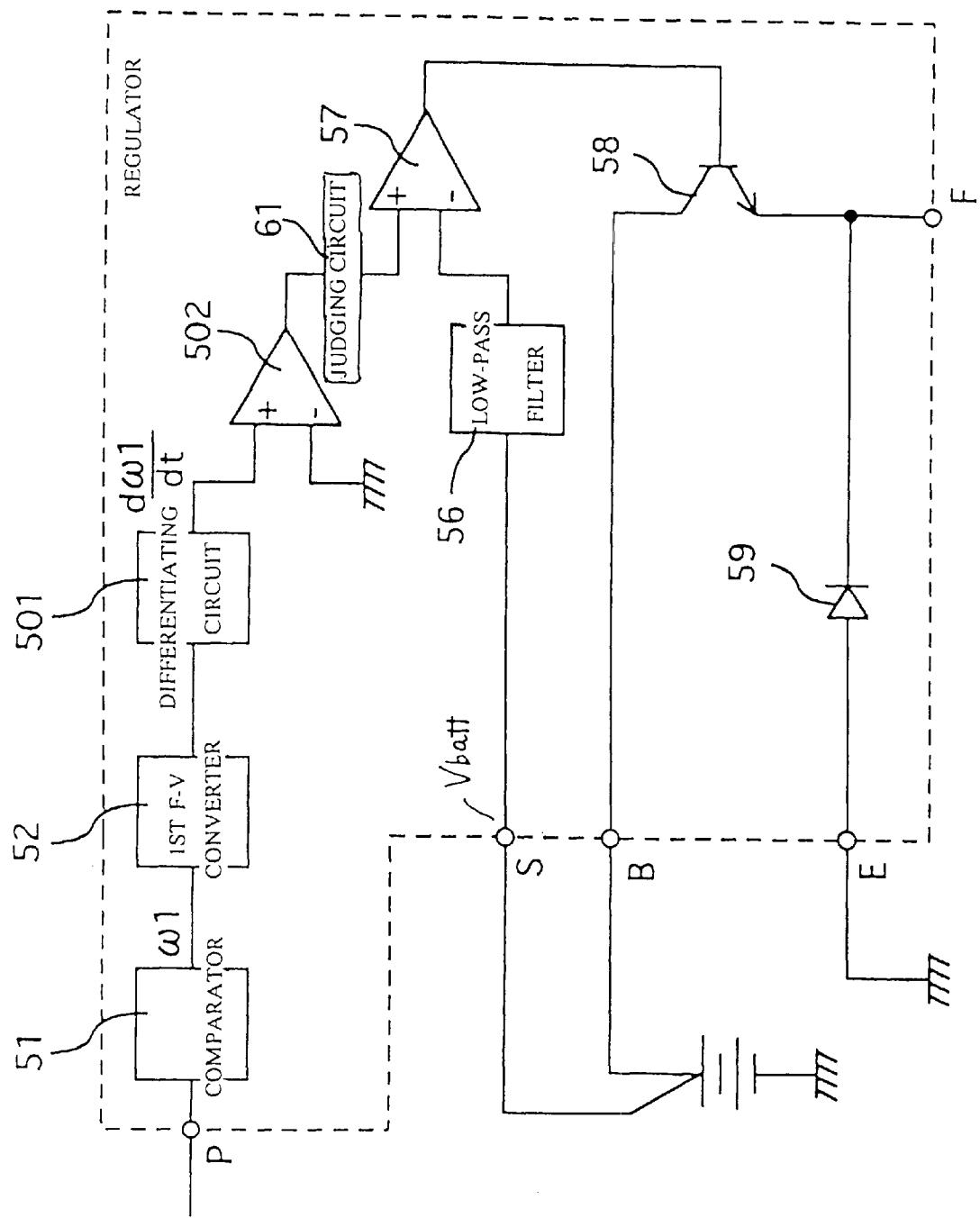
FIG. 6 is a block diagram showing the circuit arrangement for the power generation control of an automotive alternator in accordance with a third embodiment of the present invention.
Figure 7:
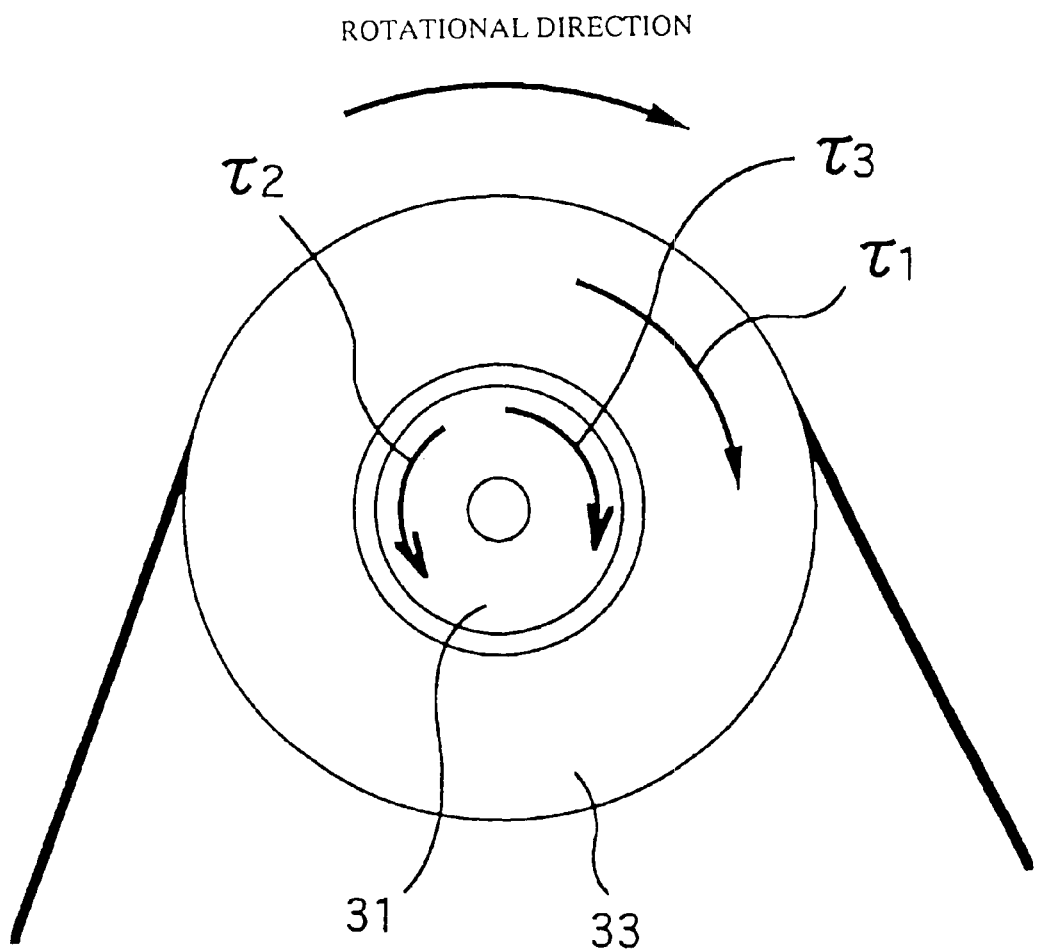
FIG. 7 is a diagram showing a mechanism of a one-way clutch installed on an automotive alternator.

A third embodiment of the present invention will be explained with reference to FIG. 6.

When the automotive alternator 100 is driven by the engine, the rotational speed of the internal wheel 31 (i.e., the rotor of the alternator) decreases after the one-way clutch is disengaged.

Accordingly, the mono-phasic voltage of the internal wheel 31 obtained from the P terminal is processed through the comparator 51 and the F–V converter 52 in the same manner as disclosed in FIG. 1 to obtain a DC voltage whose magnitude is proportional to the rotational speed $\omega1$ of the internal wheel 31. A differentiating circuit 501 produces a differential signal of the DC voltage outputted from the F–V converter 52. A comparator 502, connected to an output terminal of the differentiating circuit 501, judges that the one-way clutch is in the disengaged state when the sign of the differential signal is minus.

A switching circuit 61 switches the regulated voltage Vreg. When the output voltage of the differentiating circuit 501 is minus, the switching circuit 61 supplies a regulated voltage Vreg having a small value Vreg3 (≈12.5V) to the comparator 57. When the output voltage of the differentiating circuit 501 is plus, the switching circuit 61 supplies a regulated voltage Vreg having a large value Vreg2 (≈14.5V) to the comparator 57.

According to the third embodiment, the position detector 4 for the external wheel 33 can be omitted. Thus, it becomes possible to realize an excellent automotive alternator which is costless and capable of realizing highly reliable control for power generation.

Fourth Embodiment

Figure 10:
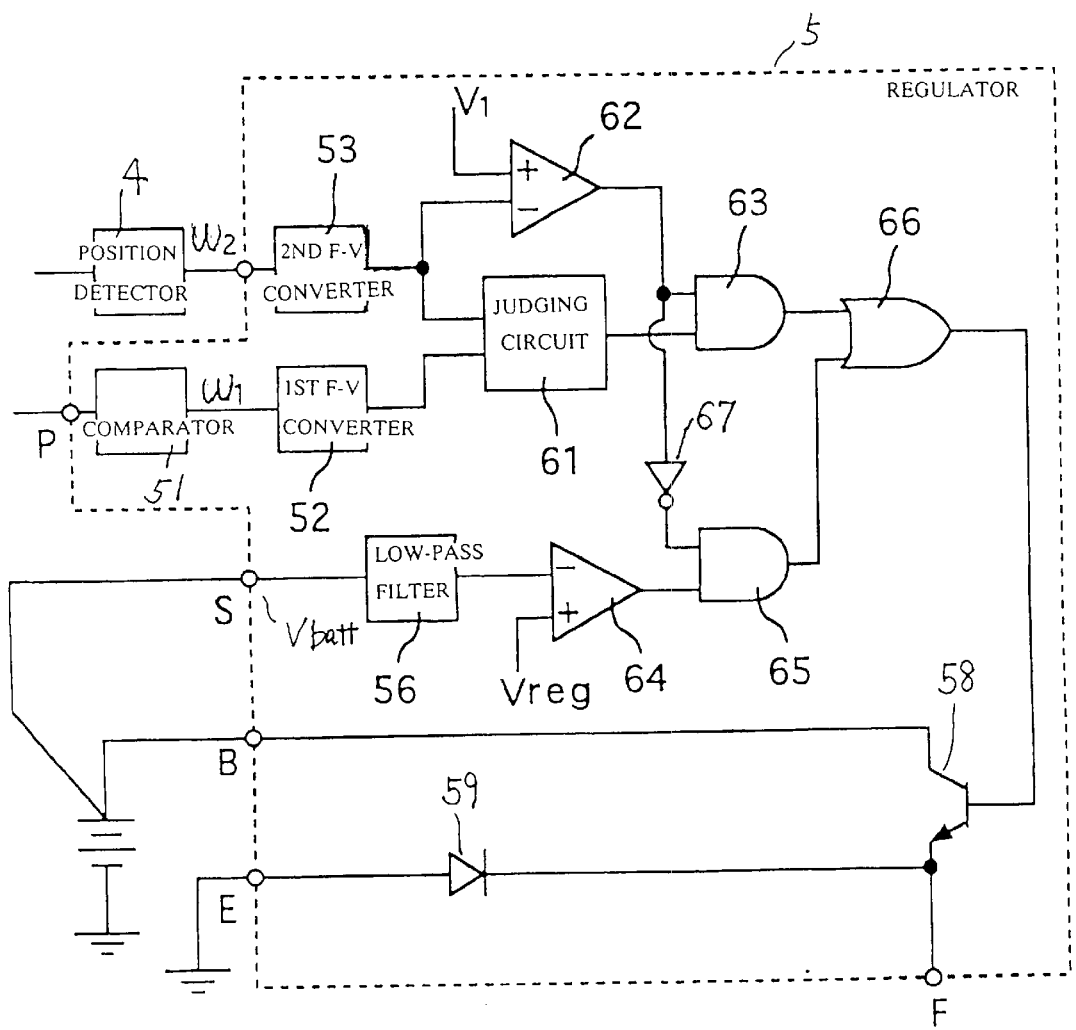
FIG. 10 is a block diagram showing the circuit arrangement for the power generation control of an automotive alternator in accordance with a fourth embodiment of the present invention.

A fourth embodiment of the present invention will be explained with reference to FIG. 10.

The fourth embodiment comprises the comparator 51, the first F–V converter 52, the second F–V converter 53, the low-pass filter 56, the power transistor 58, and the flywheel diode 59 which are structurally and functionally identical with those of the first embodiment disclosed in FIG. 1.

A judging circuit 61 judges whether or not the rotational speed $\omega2$ of the external wheel 33 is equal to the internal speed $\omega1$ of the internal wheel 31. The judging circuit 61 produces a Hi-level signal when $\omega1=\omega2$. A comparator 62 judges whether or not the rotational speed $\omega2$ of the external wheel 33 is equal to or larger than a predetermined value. An AND gate 63 produces the output signal of the judging circuit 61 in response to the output of the comparator 62. More specifically, when the rotational speed $\omega2$ of the external wheel 33 becomes smaller than the predetermined value, the comparator 62 produces a Hi-level signal. Thus, the output of the judging circuit 61 is supplied to the power transistor 58 via an OR circuit 66.

A comparator 64 compares the battery voltage Vbatt with a predetermined regulated voltage Vreg. An AND gate 65 produces the output signal of the comparator 64 in response to an output of an inverter 67. More specifically, when the rotational speed $\omega2$ of the external wheel 33 becomes smaller than the predetermined value, the inverter 67 produces a Lo-level signal. Thus, the output of the comparator 64 is not supplied to the power transistor 58 via the OR circuit 66. The OR circuit 66 functions as a means for calculating a logical sum of the outputs of two AND gates 63 and 65. In response to the output signal of the OR gate 66, the power transistor 58 turns on or off the field current.

The above-described fourth embodiment operates in the following manner.

When the rotational speed $\omega2$ of the external wheel 33 is lower than the predetermined value (e.g., idling speed of the engine), the comparator 62 supplies a Hi-level signal to the AND gate 63 so as to validate the output transmission of the judging circuit 61. Meanwhile, the inverter 67 supplies a Lo-level signal to the AND gate 65 to invalidate the output transmission of the comparator 64.

Namely, when the rotational speed is lower than the predetermined value, the comparison result between the regulated voltage Vreg and the battery voltage Vbatt is invalidated. The on/off control of power transistor 58 is solely dependent on the engaged/disengaged state of the one-way clutch. The power transistor 58 turns on during the engaged state of the one-way clutch (i.e., $\omega1=\omega2$) and turns off during the disengaged state of the one-way clutch (i.e., $\omega2<\omega1$). According to this control, it becomes possible to realize excellent power generation and torque control capable of instantly suppressing the fluctuation of engine speed responsive to the torque variation caused in each stroke of the engine.

When the rotational speed exceeds the predetermined value, the comparator 62 produces a Lo-level signal so as to invalidate the output of the judging circuit 61. The on/off control of power transistor 58 is solely dependent on the comparison result between the battery voltage Vbatt and the regulated voltage Vreg, considering the situation that the engine speed has increased to a sufficiently high level. In other words, the rotational fluctuation induced by engagement/disengagement of the one-way clutch is no longer troublesome in the sufficiently high engine speed condition and is therefore negligible. The control should be rather performed considering the excessive charging of the battery caused when the power generation ability is increased. To this end, the power transistor 58 turns off when the battery voltage Vbatt exceeds the predetermined regulated voltage Vreg and turns on when the battery voltage Vbatt becomes smaller than the predetermined regulated voltage Vreg. Thus, the fourth embodiment easily prevents the battery from being excessively charged.

The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An alternating-current generating apparatus for an automotive vehicle comprising:

a one-way clutch;

an automotive alternator driven by an internal combustion engine via said one-way clutch;

detecting means for detecting a rotational speed of either said internal combustion engine or said automotive alternator as well as an electric amount relating to a on-off state of said one-way clutch; and control means for controlling a power generation amount of said automotive alternator, wherein said control means performs at least one of two power controls when said internal combustion engine is in a low-rotational operating condition, one of said two power controls is to increase the power generation amount during an engaged state of said one-way clutch and the other of said two power controls is to decrease the power generation amount during a disengaged state of said one-way clutch.

2. The alternating-current generating apparatus for an automotive vehicle in accordance with claim 1, wherein said one-way clutch comprises a power input section for receiving a driving power from said internal combustion engine and a power output section mechanically connected to a rotor of said automotive alternator which has a plurality of filed poles;

said detecting means detects a rotational speed of said power output section based on a frequency component of an output voltage of a multiphase armature winding of said automotive alternator; and said control means compares the rotational speed of said power output section with a rotational speed of said power input section and judges that said one-way clutch is in the engaged state when said rotational speed of said power output section is equal to the rotational speed of said power input section and judges that said one-way clutch is in the disengaged state when said rotational speed of said power output section is not equal to the rotational speed of said power input section.

3. The alternating-current generating apparatus for an automotive vehicle in accordance with claim 2, wherein said one-way clutch comprises an external wheel portion constituting said power input section, an internal wheel portion disposed coaxially with said external wheel portion and constituting said power output section, and a clutch portion selectively engaging or disengaging said external wheel portion and said internal wheel portion.

4. The alternating-current generating apparatus for an automotive vehicle in accordance with claim 1, wherein said automotive alternator has a field winding, and said control means is associated with switching means connected in series with said field winding for on-off controlling power current supply to said field winding, wherein said control means closes said switching means when said one-way clutch is in the engaged state and opens said switching means when said one-way clutch is in the disengaged state.

* * * * *